US012752440B2

(12) United States Patent
Riedel

(10) Patent No.: US 12,752,440 B2
(45) Date of Patent: Oct. 6, 2026

(54) GRIPPER WITH BENDABLE FINGERS AND SWITCHING MEANS

(71) Applicant: KUKA Deutschland GmbH, Augsburg (DE)

(72) Inventor: Martin Riedel, Augsburg (DE)

(73) Assignee: KUKA Deutschland GmbH (DE)

( * ) Notice: Subject to any disclaimer, the term of this patent is extended or adjusted under 35 U.S.C. 154(b) by 341 days.

(21) Appl. No.: 18/722,714

(22) PCT Filed: Dec. 1, 2022

(86) PCT No.: PCT/EP2022/084042
§ 371 (c)(1),
(2) Date: Jun. 21, 2024

(87) PCT Pub. No.: WO2023/117358
PCT Pub. Date: Jun. 29, 2023

(65) Prior Publication Data
US 2025/0108520 A1 Apr. 3, 2025

(30) Foreign Application Priority Data
Dec. 23, 2021 (DE) ..................... 10 2021 134 454.9

(51) Int. Cl.
*B25J 15/12* (2006.01)
*B25J 9/10* (2006.01)

(52) U.S. Cl.
CPC ............... *B25J 15/12* (2013.01); *B25J 9/104* (2013.01)

(58) Field of Classification Search
CPC ........ B25J 15/00; B25J 15/0009; B25J 15/02; B25J 15/0233; B25J 15/028; B25J 15/12; B25J 9/104
See application file for complete search history.

(56) References Cited

U.S. PATENT DOCUMENTS

2007/0241573 A1* 10/2007 Teng .......................... B25J 1/04 294/198
2014/0007730 A1* 1/2014 DeLouis .............. B25J 15/0009 74/490.03

(Continued)

FOREIGN PATENT DOCUMENTS

| | | | |
|---|---|---|---|
| CN | 107471236 | A | 12/2017 |
| DE | 102006009559 | B3 | 5/2007 |

(Continued)

OTHER PUBLICATIONS

German Patent Office; Search report in related German Patent Application No. 10 2021 134 454.9 dated Sep. 29, 2022; 10 pages.

(Continued)

*Primary Examiner* — George Sun
(74) *Attorney, Agent, or Firm* — Dorton & Willis, LLP

(57) ABSTRACT

A gripper includes a main gripper body and at least two gripper fingers, at least one of which is movably mounted on the main gripper body. The gripper has a switch that can be switched between a first switch position and a second switch position, wherein the first switch position, fully releases a pulling device so that by the pulling device being pulled, the gripper finger movably mounted on the main gripper body is pulled into a closed position and the kinematic chain of the finger elements of the movably mounted gripper finger is bent. In the second switch position, a pulling section of the pulling device running along the kinematic chain of the finger elements of the movably mounted gripper finger is locked, so that by the pulling device being pulled, the gripper finger is only pulled into its closed position without the kinematic chain of the finger elements of the gripper finger being bent.

10 Claims, 7 Drawing Sheets

(56) References Cited

U.S. PATENT DOCUMENTS

| | | | | |
|---|---|---|---|---|
| 2014/0035306 | A1 * | 2/2014 | Garcia | B25J 15/08 294/213 |
| 2017/0105346 | A1 * | 4/2017 | Davidson | A01D 46/30 |
| 2017/0203443 | A1 * | 7/2017 | Lessing | B25J 15/10 |
| 2017/0252930 | A1 * | 9/2017 | Birglen | B25J 9/1065 |
| 2018/0036145 | A1 * | 2/2018 | Jury | A61F 2/586 |
| 2019/0202070 | A1 * | 7/2019 | Nakagawa | B25J 9/1612 |
| 2019/0375114 | A1 * | 12/2019 | Williams | B25J 15/0009 |

FOREIGN PATENT DOCUMENTS

| | | | |
|---|---|---|---|
| DE | 102018222312 | A1 | 7/2019 |
| DE | 102020207035 | A1 | 12/2021 |
| DE | 102020207038 | A1 | 12/2021 |
| EP | 3402635 | B1 | 11/2018 |
| JP | S5969288 | A | 4/1984 |

OTHER PUBLICATIONS

European Patent Office; Search Report in related International Patent Application No. PCT/EP2022/084042 dated Feb. 23, 2023; 3 pages.

* cited by examiner

GRIPPER WITH BENDABLE FINGERS AND SWITCHING MEANS

CROSS-REFERENCE TO RELATED APPLICATIONS

This application is a national phase application under 35 U.S.C. § 371 of International Patent Application No. PCT/EP2022/084042, filed Dec. 1, 2022 (pending), which claims the benefit of priority to German Patent Application No. DE 10 2021 134 454.9, filed Dec. 23, 2021, the disclosures of which are incorporated by reference herein in their entirety.

TECHNICAL FIELD

The invention relates to a gripper, comprising a main gripper body, at least two gripper fingers, of which at least one is movably mounted on the main gripper body, and at least one drive motor, which is designed to move the at least one gripper finger assigned to it and is movably mounted on the main gripper body, wherein the at least one gripper finger movably mounted on the main gripper body has a kinematic chain of a plurality of successive finger elements mounted so as to be adjustable relative to one another, wherein a proximal finger element in the kinematic chain forms a finger root element and a distal finger element in the kinematic chain forms a fingertip element, and at least one pulling means extending longitudinally along the kinematic chain of the respective finger elements is provided, which is connected to the fingertip element and which is designed to move the gripper finger movably mounted on the main gripper body from an open position into a closed position of the movably mounted gripper finger and to bend the kinematic chain of the finger elements of the movably mounted gripper finger by pulling on the pulling means.

BACKGROUND

DE 10 2006 009 559 B3 describes a gripper device in the form of an artificial hand with at least two fingers attached to a frame, of which at least one finger can be transferred from an extended to a bent finger position by means of an actuator along a plane of movement assigned to the finger, wherein the finger is formed in one piece and has a longitudinal extension along which at least one region is provided around which the finger can be bent in the plane of movement assigned to it, wherein the at least one region around which the finger can be bent in the plane of movement assigned to it is formed in a joint-like manner, such that an elongated actuating element with two actuating element ends that transmits tensile and compressive forces is provided along the at least one finger that can be bent by an actuator, of which one actuating element end is connected to a fingertip region of the finger opposite the frame and the other actuating element end is integrally connected to the actuator.

SUMMARY

The object of the invention is to improve a gripper which has at least one bendable gripper finger in such a way that, on the one hand, convex objects can be reliably gripped by bending the at least one bendable gripper finger but, on the other hand, flat-walled objects can also be reliably gripped without the at least one bendable gripper finger bending. In particular, a purely mechanical solution is to be created that does not require additional active drives.

The object is achieved by a gripper having a main gripper body, at least two gripper fingers, at least one of which is movably mounted on the main gripper body, and at least one drive motor which is designed to move the at least one gripper finger assigned to it and movably mounted on the main gripper body, wherein the at least one gripper finger movably mounted on the main gripper body has a kinematic chain of a plurality of successive finger elements which are mounted so as to be adjustable relative to one another, wherein a proximal finger element in the kinematic chain forms a finger root element and a distal finger element in the kinematic chain forms a fingertip element, and at least one pulling means extending longitudinally along the kinematic chain of the respective finger elements is provided, which is connected to the fingertip element and which is designed to move the gripper finger movably mounted on the main gripper body from an open position into a closed position of the movably mounted gripper finger and to bend the kinematic chain of the finger elements of the movably mounted gripper finger by pulling on the pulling means, wherein the gripper has a switching means which can be switched between a first switch position and a second switch position, which in the first switch position fully releases the pulling means, so that by pulling on the pulling means the gripper finger movably mounted on the main gripper body is both pulled into its closed position and the kinematic chain of the finger elements of the movably mounted gripper finger is bent, and which in the second switch position blocks a pulling means section of the pulling means running along the kinematic chain of the finger elements of the movably mounted gripper finger, so that by pulling on the pulling means the gripper finger movably mounted on the main gripper body is pulled only into its closed position without the kinematic chain of the finger elements of the movably mounted gripper finger being bent.

The gripper finger concerned is movably mounted on the main gripper body, for example is linearly adjustable, i.e. corresponding to a jaw gripper, or is pivotably adjustable, i.e. corresponding to a pincer gripper. A combined movement of the gripper finger can also be provided.

The pulling means runs from a gripper center, i.e. a central axis of symmetry of the gripper, along which the motor or the motor shaft or spindle shaft of the motor also extends, to a lower entry point into the finger root element, where it is deflected by approximately 90 degrees, so that the pulling means is routed distally upwards along the longitudinal extension of the finger elements of the gripper finger and is fastened in place at the distal fingertip element. By pulling on the pulling means, the gripper finger can accordingly be pulled into its closed position in that the pulling means adjusts the finger root element relative to the main gripper body, wherein in addition the pulling means section of the pulling means running along the gripper finger is shortened so that the chain of finger elements of the gripper finger bends.

According to the invention, the switching means locks or brakes or clamps this pulling means or a separate additional pulling means in the gripper finger, so that despite the pulling means being pulled, the chain of the finger elements of the gripper finger does not bend when the switching means is in its second switch position but the gripper still closes as a result of the pulling.

Essentially, the switching means comprises a sensing element which is activated during closure of the gripper when the movable gripper finger touches the object to be gripped, and a pulling-means clamping device which locks or brakes or clamps the pulling means or a separate additional pulling means in the gripper finger in order to prevent the gripper finger from bending during closure of the gripper finger when the sensing element is actuated, i.e. the switching means is in the second switch position.

In principle, the switching means can be based on different physical principles. Only the pulling-means clamping device needs to operate mechanically insofar as the pulling-means clamping device is designed to arrest or lock the pulling means. The switching means, in particular the sensing element, and the coupling means can generally operate mechanically, electrically, magnetically, hydraulically and/or pneumatically, or consist of a combination of these modes of operation, for example electro-mechanically. The sensing element can thus provide a signal which is transmitted, for example, electrically or electronically to the pulling-means clamping device. Alternatively or additionally, a force or a moment can be transmitted from the sensing element to the pulling-means clamping device, for example via a mechanical coupling, such as a coupling rod or a wire. However, the coupling can also transmit magnetically, hydraulically and/or pneumatically if necessary.

The position of the sensing element determines whether the gripper finger can bend or remain straight when it is moved into its closed position. The actuation distinction here is whether there is or is not contact between the sensing element arranged on the distal element and the object to be gripped.

If an object touches the gripper finger at the distal element first, it will be either an object that is gripped in a pincer grip, e.g. a small object, or an object that has essentially straight parts of the surface so that these can be clamped parallel.

If, on the other hand, the finger middle elements touch the object first, the gripper finger should be bent in order to enclose this object as well as possible. Bending of the gripper finger is possible until the distal fingertip element or the sensing element is touched by the object and the gripper finger then rests completely against it. From this point on, the fingers are essentially only pressed together towards the middle and no longer bent further.

The gripper finger concerned therefore comprises a mechanical sensing element, pivoting, sliding or otherwise mounted, which mechanically transmits contact with the object to a locking element, i.e. the pulling-means clamping device, and locks the gripper finger against further bending. This actuation sensing element can be spring-loaded and is in an open end position when deployed.

The switching means can be a driveless switching means which comprises a mechanical sensing element mounted on the fingertip element, a pulling-means clamping device and a coupling means which transmits the movement of the mechanical sensing element to the pulling-means clamping device, so that when the sensing element is actuated, the pulling-means clamping device is moved into its clamping position in order to assume the second switch position of the switching means.

In the second switch position of the switching means, the pulling means, for example an actuator wire, is clamped by a locking device at the level of the proximal finger root element in such a way that the entire wire pulling force is transmitted only to the proximal finger root element. As a result, there is no relative tensile force between the finger middle elements, which would shorten the gripper finger on the finger frontal side. The force on the individual finger middle elements is transmitted as a pressure force via the dorsal sides lying on top of each other.

As a possible embodiment, actuators, i.e. the sensing element, and the locking device, i.e. the pulling-means clamping device, can in each case be designed as spring-loaded levers which are mechanically connected via a coupling means, such as a traction wire. The coupling means or the traction wire can preferably be routed in the neutral bending axis of the gripper finger and thus does not experience any change in length when the finger is bent. The clamping can take place in the region of a deflection at the fingertip.

The pulling-means clamping device can be formed on the finger root element and be designed in its clamping position to lock at the finger root element the pulling means leading through the finger root element in the second switch position of the switching means.

The pulling-means clamping device can be designed in the form of a clamping wedge or a brake block. The pulling-means clamping device can comprise a pivoting element or a pivoting block, which is pivotably mounted, for example, on the finger root element. The clamping wedge or the brake block thus pivotably mounted comprises a clamping surface which in the second switch position of the switching means presses against the pulling means in order to clamp the pulling means between the clamping wedge or the brake block and a counter-holder which is fixedly formed on the finger root element.

The mechanical sensing element can be pivotably mounted on the fingertip element and comprise a first lever to which a distal end of the coupling means is connected, wherein a proximal end of the coupling means is connected to a second lever which is pivotably mounted on the finger root element and carries the pulling-means clamping device.

The coupling means can be, for example, a coupling rod or a coupling wire which connects the first lever to the second lever so that the second lever executes a movement synchronous with the movement of the first lever. To achieve a certain transmission ratio, the first lever and the second lever can have different effective lever lengths. Alternatively, the first lever and the second lever may have identical effective lever lengths.

The coupling means can be designed as a second pulling means which is routed along the kinematic chain of the finger elements of the movably mounted gripper finger in the region of a neutral bending axis of the gripper finger from the fingertip element to the finger root element.

In contrast to the previously described embodiment, a second basic embodiment is based on fixing the length of the gripper finger dorsal side and thus on preventing the gripper finger dorsal side from stretching in order to allow bending. In this case, an actuator, i.e. the sensing element, when it comes into contact with an object presses on a locking device which locks a separate pulling means, in particular a separate wire or arresting wire. This separate wire runs along the finger dorsal side, attached to the proximal element, over the finger middle elements to the distal fingertip element, through which when the actuator is not activated it is routed in an arc of 180 degrees with as little loss as possible. Since the dorsal side of the gripper finger elongates when bending, the separate wire is pulled through the distal fingertip element on the dorsal side as well. When stretching, it has to be pulled back out of the dorsal side in a relatively opposite direction. To achieve this, the loose end of the wire can either be kept under tension by a spring or be positively connected to a part of the gripper in order to thus be kept under tension. Preferably, the second end of the locking wire is also attached to the proximal finger root element and routed along the finger frontal side. This wire routing ensures a sufficiently good length, since the frontal side is shortened by the same order of magnitude as the dorsal side is lengthened. A slight constructional adjustment of the angle of the wire routing toward the finger median plane (frontal and/or dorsal side of the finger) can be used as a correction factor in order to achieve an ideal design of the ratio of compression and expansion should this be necessary.

When the actuator is activated, the clamping takes place in the distal fingertip element, preferably essentially on the finger frontal side, by clamping the wire between the locking device and the distal fingertip element or within a deflection in the fingertip element.

In another slightly modified embodiment, in contrast to the variant just described, the separate wire is not attached as an end point on the dorsal side of the proximal finger root element, but is routed there in a loop, so that a double wire configuration symmetrical to the finger median plane is created. However, the operating mode and principle remain completely unchanged.

For this purpose, the anchoring means is routed from the finger root element from an inner side of the gripper finger via a deflection in the fingertip element to the outer side of the gripper finger and is routed back from the outer side of the gripper finger to the inner side of the gripper finger up to the finger root element by means of a deflection formed on the finger root element.

The pulling-means clamping device can be formed on the fingertip element and be designed in its clamping position to lock an anchoring means running through the fingertip element in the second switch position of the switching means on the fingertip element.

By forming the pulling-means clamping device on the fingertip element, the components of sensing element, coupling means and pulling-means clamping device can be fully integrated into the fingertip element without the coupling means having to be routed through the entire gripper finger via a plurality of finger middle elements. The anchoring means can provide the bendable gripper finger with additional stability.

The anchoring means can have a first end section anchored to the finger root element on the convex side of the neutral bending axis of the kinematic chain of the finger elements of the movably mounted gripper finger, a second end section anchored to the finger root element on the concave side of the neutral bending axis of the kinematic chain of the finger elements of the movably mounted gripper finger, and a middle section which runs from the first end section on the finger root element on the concave side of the gripper finger to the fingertip element and from the fingertip element on the concave side of the gripper finger back to the finger root element, and which ends at the second end section on the finger root element.

The middle section of the anchoring means routed through the fingertip element can in the first switch position of the switching means be released for the anchoring means to pass through the fingertip element and in the second switch position of the switching means the anchoring means can be fastened in place in the fingertip element by the pulling-means clamping device.

The anchoring means can, starting from the finger root element, be routed from an inner side of the gripper finger via a deflection in the fingertip element to the outer side of the gripper finger and can be routed from the outer side of the gripper finger back to the inner side of the gripper finger up to the finger root element by means of a further deflection formed on the finger root element.

The gripper finger movably mounted on the main gripper body can be mounted on the main gripper body in a linearly displaceable manner, wherein a linear adjustment of the gripper finger relative to the main gripper body takes place when the pulling means of the movably mounted gripper finger is pulled.

The gripper finger movably mounted on the main gripper body can be pivotably mounted on the main gripper body, wherein a pivoting adjustment of the gripper finger relative to the main gripper body takes place when the pulling means of the movably mounted gripper finger is pulled.

A linear movement of the at least one gripper finger or of the plurality of gripper fingers, in particular of two gripper fingers, can be superimposed with a pivoting adjustment of the gripper finger or of the gripper fingers. This means that at least one gripper finger can perform a combined pushing/pivoting movement.

An essentially linear adjustment in combination with a pivoting movement component can be effected, for example, by means of a parallelogram linkage by which the gripper finger is mounted on the main gripper body.

An adjustable mounting of the at least one gripper finger, in particular of two gripper fingers, on the main gripper body can be effected, for example, by means of a parallelogram four-bar linkage. In this case, the parallelogram four-bar linkage comprises two long bars arranged parallel to each other and two short bars arranged parallel to each other, each connected by a revolute joint or a pivot joint. The bars and the pivot joints can be formed as a one-piece molded part. Alternatively, the parallelogram four-bar linkage can however be replaced for example by a simple pivot joint or revolute joint or a combination of pivot joint and revolute joint.

The gripper can accordingly comprise a main gripper body on which, via an elastically deformable double joint, each gripper finger is routed in parallel and symmetrically to the gripper center, along the axis of rotation of the motor shaft of the gripper motor. The gripper fingers are actively pulled together towards the gripper center by a pulling means, such as a wire, for gripping and are passively pulled outwards again for release via separate, antagonistic elastic bands, so-called finger return bands. The pulling means is positioned continuously between two gripper fingers. In each case it engages the distal finger element, is routed through the finger middle elements and is deflected at the proximal element by an angle of essentially 90° so that it can be wound onto a centrally arranged wire shaft which sits on the motor shaft or is formed thereby. If the gripper finger is bent during contact with an object to be gripped, an elastic finger extension band supports the finger's return to the extended position when it is later released.

Specific embodiments of the invention are explained in more detail in the following description with reference to the accompanying drawings. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
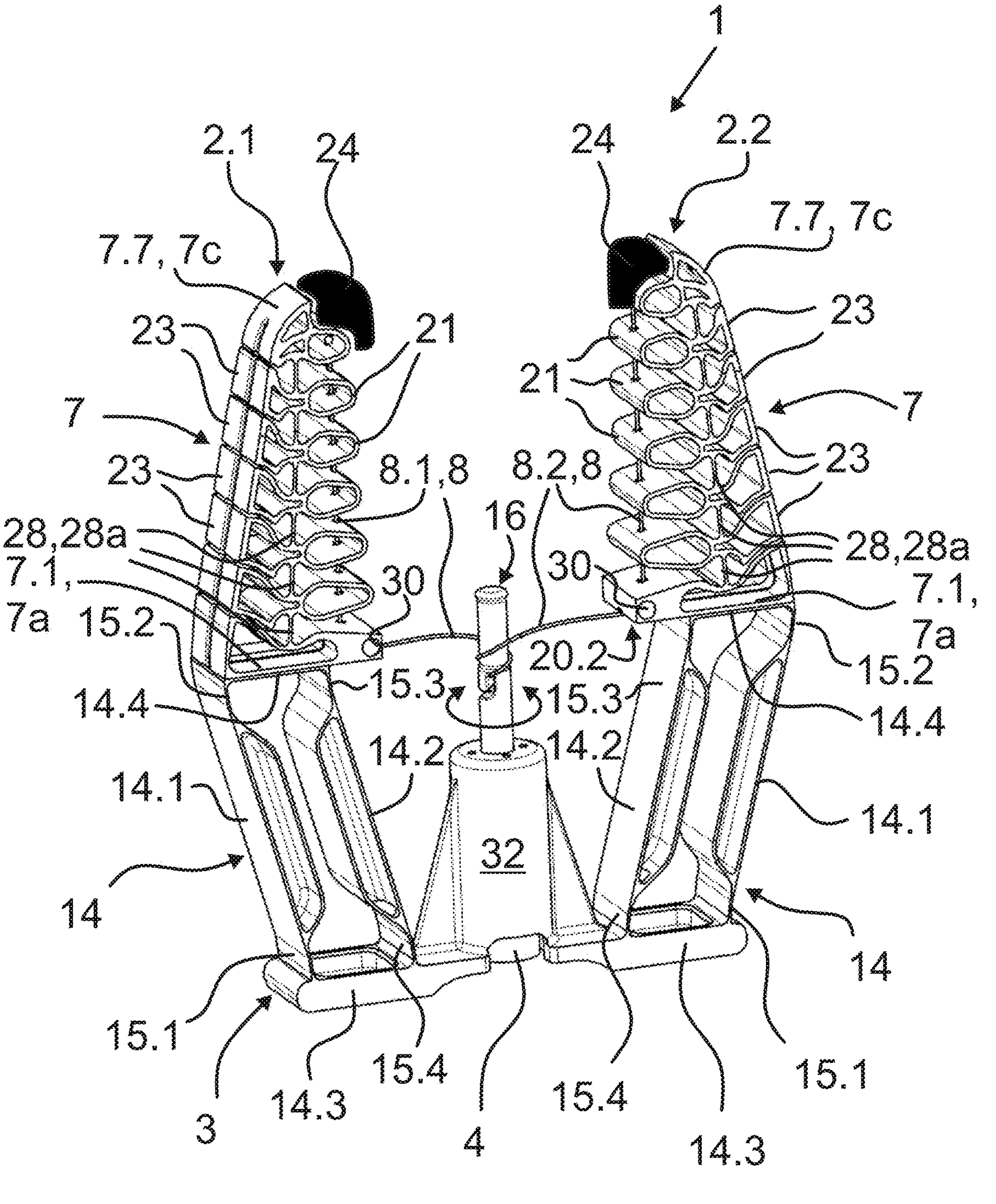
FIG. 1 is a perspective view of an exemplary embodiment of a gripper with a puller wire actuating means, wherein the gripper fingers are designed as kinematic chains of a plurality of elements and joints, which can be not only closed but also bent by means of a puller wire as a pulling means.
Figure 2:
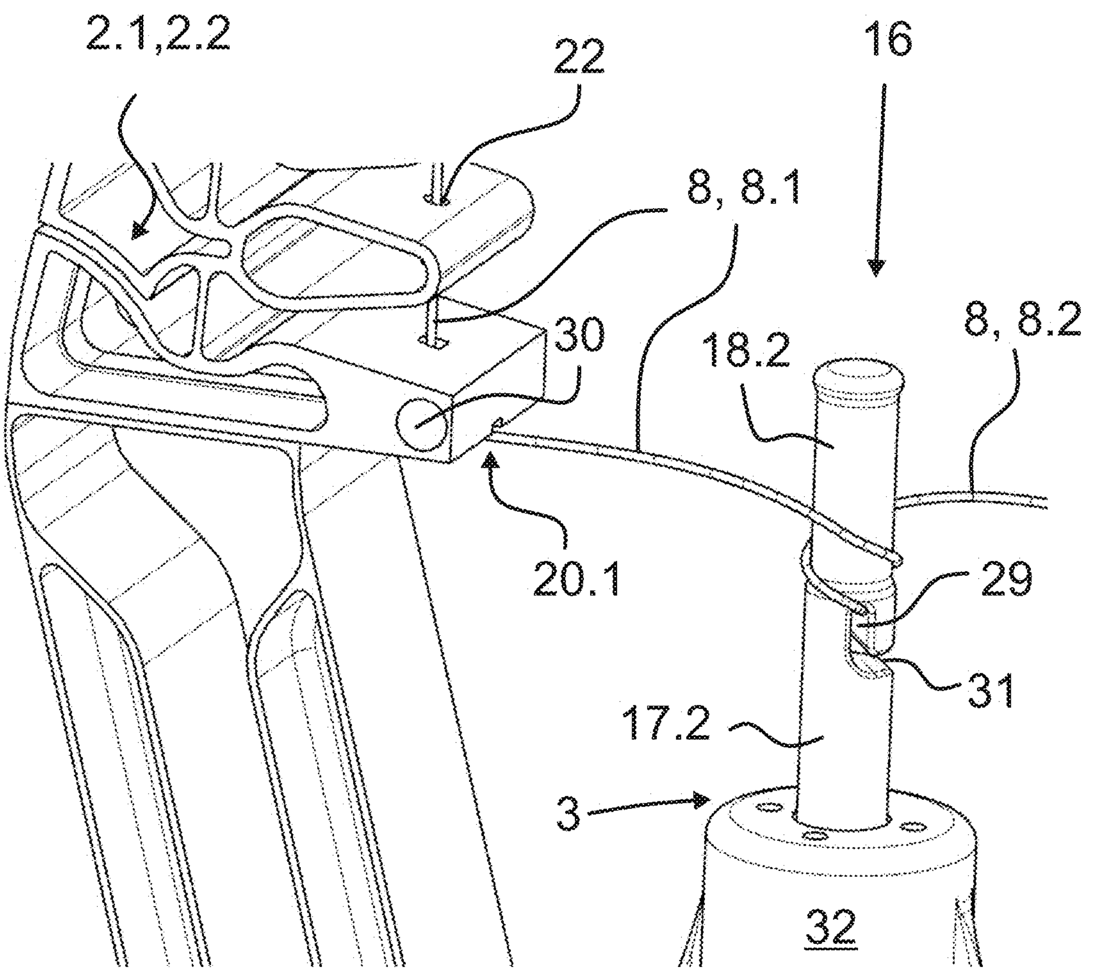
FIG. 2 is an enlarged perspective partial view of the central puller wire actuating means according to FIG. 1.
Figure 3:
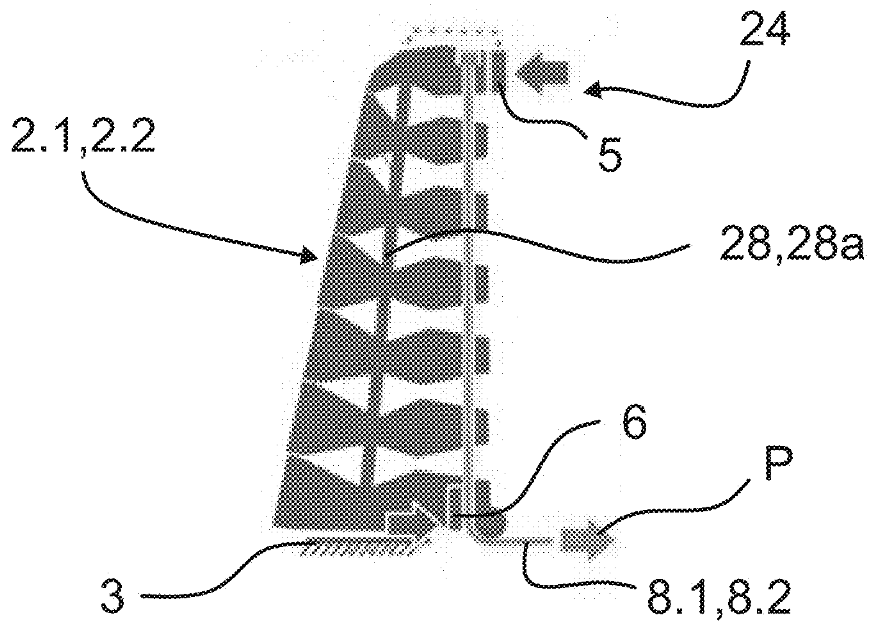
FIG. 3 is a schematic representation of a first exemplary embodiment of a switching means in the extended position of the bendable gripper finger with the pulling means released.
Figure 4:
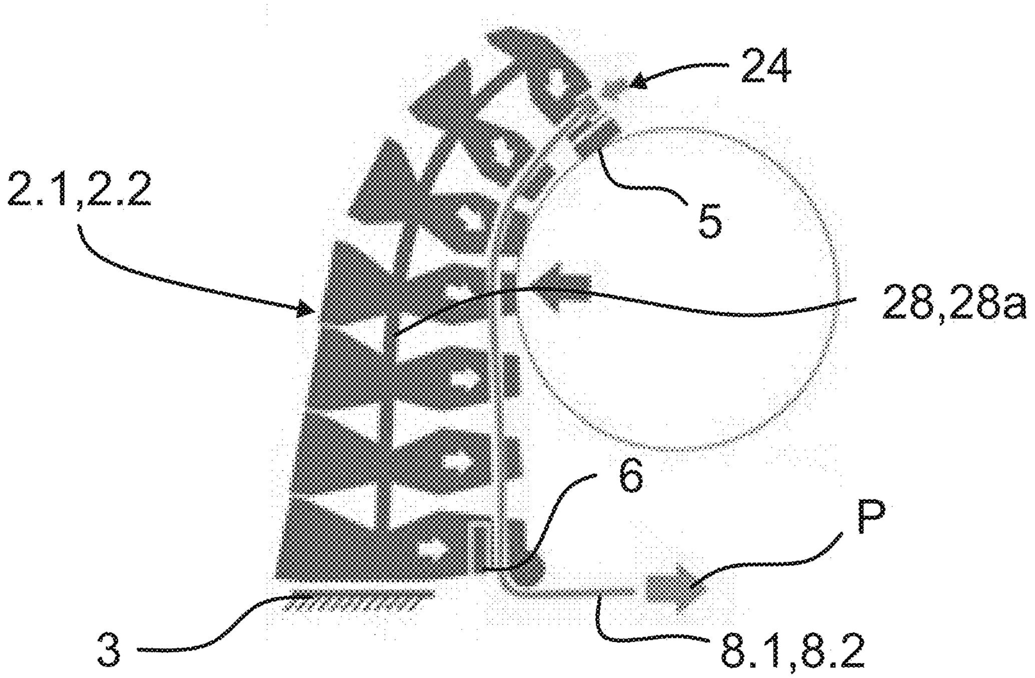
FIG. 4 is a schematic representation of the first exemplary embodiment of the switching means according to FIG. 3 in a bent position of the bendable gripper finger when the pulling means is released.
Figure 5:
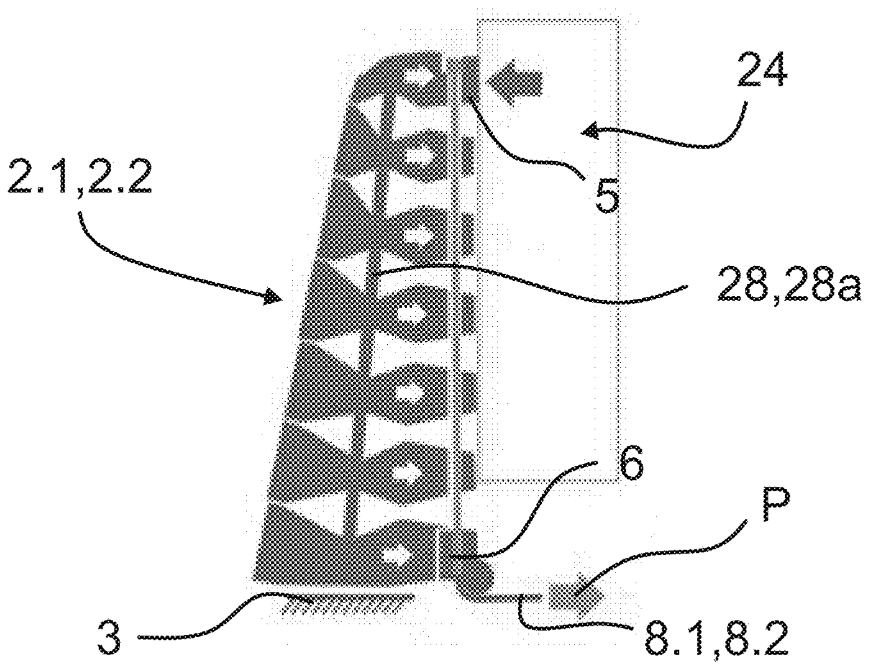
FIG. 5 is a schematic representation of the first exemplary embodiment of the switching means according to FIG. 3 in the extended position of the gripper finger when the pulling means is locked, so that the gripper finger can no longer be bent.

An exemplary embodiment of a gripper 1 is shown in FIG. 1 and FIG. 2.

The gripper 1 comprises a main gripper body 3 and a pair of, i.e. two, gripper fingers 2.1, 2.2, which are each adjustably mounted on the main gripper body 3.

The two gripper fingers 2.1, 2.2 are each formed by a kinematic chain of a plurality of successive finger elements 7 that are adjustably mounted relative to one another, of which in each case a distal finger element 7.7 in the kinematic chain forms a fingertip element 7*c*, wherein in each case at least one section of a pulling means 8.1, 8.2 extends longitudinally along the kinematic chain of the respective finger elements 7, and the respective pulling means 8.1, 8.2 is connected to the respective fingertip element 7*c*, so that when a tensile force is introduced into the respective pulling means 8.1, 8.2, the corresponding gripper finger 2.1, 2.2 executes a closing movement and the tensile force can also cause the kinematic chain of the finger elements 7 to bend simultaneously.

The multiple successive finger elements 7, which are mounted so as to be adjustable relative to one another, are designed, for example, as a one-piece gripper finger body, wherein in each case two adjacent finger elements 7 can be connected via an integral hinge-like web 28, and the plurality of webs 28 form a support column of the gripper finger 2.1, 2.2 which extends longitudinally within the gripper finger 2.1, 2.2. These webs 28 or the support column form a neutral bending axis 28*a* of the respective gripper fingers 2.1, 2.2.

Each finger element 7, with the exception of the proximal finger element 7.1, which forms a finger root element 7*a*, has a preferably elastic hollow body 21, which forms a contact body with which the gripper finger 2.1, 2.2 can contact an object to be gripped. The hollow body 21 can be designed as a hollow cylinder, wherein the cylinder axes extend parallel to each other.

Each hollow body 21 has holes 22 (FIG. 2) through which one of the pulling means 8.1, 8.2 is threaded. In an assembled state, the first pulling means 8.1, 8.2 are thus in each case located within the contour of the respective finger elements 7 or within the contour of the hollow bodies 21. The hollow bodies 21 extend, starting from the neutral axis 28*a* which is defined by the integral hinge-like webs 28, in the direction of the object to be gripped, namely with cross-sectional contours such that the hollow bodies 21 taper towards the object to be gripped. As a result, in an extended state of the gripper finger 1, gaps are created in each case between two adjacent hollow bodies 21, which make it possible for the gripper finger 1 to bend.

Opposite the hollow bodies 21, on the other side of the neutral axis 28*a* or of the webs 28, dorsal support bodies 23 are formed, which support one another in the extended state of the gripper finger 2.1, 2.2. For this purpose, the support bodies 23 have flat, pressure-resistant support wall sections arranged on the outside, which abut one another at the front in the extended state of the gripper fingers 2.1, 2.2. The flat, pressure-resistant support wall sections, together with the integral hinge-like webs 28, which form the support column of the gripper finger 2.1, 2.2, form a box frame that is flexurally rigid in the opening direction.

At the upper end of each gripper finger 2.1, 2.2, a switching means 24 according to the invention is formed on the respective fingertip element 7.7. The switching means 24 can be designed in different ways and is explained in more detail below with reference to FIG. 3 to FIG. 12.

An adjustable mounting of the two gripper fingers 2.1, 2.2 on the main gripper body 3 is effected, for example as shown, by means of a parallelogram four-bar linkage 14. The parallelogram four-bar linkage 14 comprises two long bars 14.1, 14.2 arranged parallel to one another and two short bars 14.3, 14.4 arranged parallel to one another, which are each connected by a revolute joint or a pivot joint 15.1, 15.2, 15.3, 15.4. In the case of the present embodiment, the bars 14.1, 14.2, 14.3, 14.4 and the pivot joints 15.1, 15.2, 15.3, 15.4 are formed as a one-piece molded part. Alternatively, the parallelogram four-bar linkage 14 can however also be replaced, for example, by a simple pivot joint or revolute joint, which is however not shown in the embodiment shown.

The gripper 1 has a drive motor 4 arranged on the main gripper body 3, which is designed to move the at least two gripper fingers 2.1, 2.2, wherein the at least two gripper fingers 2.1, 2.2 are in each case moved by means of the pulling means 8.1, 8.2, for example. A tensile force can be introduced into the respective pulling means 8.1, 8.2 by the drive motor 4 in order to selectively open or close the gripper 1 by moving the at least two gripper fingers 2.1, 2.2 and, if necessary, to carry out the bending.

The gripper 1 has, for example, as shown, a central puller wire actuating means 16. This puller wire actuating means 16 is shown more clearly in FIG. 2 in an enlarged partial view.

The puller wire actuating means 16 is arranged between the at least two gripper fingers 2.1, 2.2 and is designed to pull the two pulling means 8.1, 8.2 of the two gripper fingers 2.1, 2.2 in the closing direction of the gripper 1 from one side toward the central puller wire actuating means 16 by means of a drive movement of the drive motor 4 arranged on the main gripper body 3.

The central puller wire actuating means 16 according to FIG. 1 is shown even more clearly in an enlarged partial view in FIG. 2. The puller wire actuating means 16 comprises a shaft 17.2 which is arranged centrally between the one gripping side of a gripper finger 2.1 and the other gripping side of the other gripper finger 2.2 and extends longitudinally parallel to the gripping sides. The shaft 17.2 is rotatably mounted on the main gripper body 3. The shaft 17.2 has a longitudinal wall 18.2 which is designed for simultaneously winding-on the one pulling means 8.1 of the one gripper finger 2.1 and the other pulling means 8.2 of the other gripper finger 2.2 when the shaft 17.2 rotates in a winding-on direction.

In the case of the present exemplary embodiment, the longitudinal wall 18.2 is waisted.

The puller wire actuating means 16, i.e. in the case of the present exemplary embodiment the shaft 17.2 rotatably mounted on the main gripper body 3, has, for example, a shaft through-hole 29 through which the puller wire 8 is routed in the wire direction, in particular is routed therethrough displaceably, wherein the puller wire 8 is designed to actuate the pair of two oppositely arranged gripper fingers 2.1, 2.2 in that one end of the puller wire 8 is connected to one gripper finger 2.1 and the other end of the puller wire 8 is connected to the other gripper finger 2.2. The puller wire 8 comprises the one pulling means 8.1 of the one gripper finger 2.1 and the other pulling means 8.2 of the other gripper finger 2.2. The one pulling means 8.1 of the one gripper finger 2.1 and the other pulling means 8.2 of the other gripper finger 2.2 can accordingly be formed by a single puller wire 8. In the second embodiment according to FIG. 1 and FIG. 2, the pulling means 8.1, 8.2 not only serves to move the two gripper fingers 2.1, 2.2 toward each other in order to close the gripper 1, but also serves to bend the respective gripper finger 2.1, 2.2 by deflecting the respective pulling means 8.1, 8.2 by 90 degrees on associated deflection means 30 for each gripper finger 2.1, 2.2, such as deflection rods or deflection rollers, and is routed along the longitudinal extension of the gripper fingers 2.1, 2.2 as far as the respective fingertip element 7.7 and not fastened in place until there.

Due to the shaft through-hole 29 through which the puller wire 8 is loosely routed (FIG. 2) and due to the ends of the pulling means 8.1, 8.2 fastened in place at the fingertip elements 7.7, the two pulling means 8.1, 8.2 are wound up onto the longitudinal wall 18.2 of the shaft 17.2 and in this way the pulling means 8.1, 8.2 are shortened and the two gripper fingers 2.1, 2.2 are not only moved towards each other and thus the gripper 1 closed, but the gripper fingers 2.1, 2.2 are also possibly bent by the pulling means 8.1, 8.2 being routed over the deflection means 30 and pulling on the respective fingertip element 7.7 so that the finger elements 7 twist and thus bend the gripper fingers 2.1, 2.2.

The shaft through-hole 29 can be formed with an open-sided recess 31, so that a middle section of the puller wire 8 can be hooked into the shaft through-hole 29 in a radial feed direction from outside the longitudinal wall of the shaft 17.2.

When the gripper fingers 2.1, 2.2 are fully opened, it can be provided that the puller wire 8 runs extendedly through the shaft through-hole 29, without the puller wire 8 wrapping around the longitudinal wall 18.2 of the shaft 17.2 in this fully open position of the gripper fingers 2.1, 2.2. In this state, the puller wire 8 can then automatically realign itself centrally relative to the shaft 17.2 if undesirable side effects, for example due to asymmetrical friction effects, have led to the two gripper fingers 2.1, 2.2 being actuated differently, i.e. the two pulling means 8.1, 8.2 were wound on differently.

One pulling means 8.1 can be coupled to a first articulation point 20.1 on the one gripper finger 2.1 and the other pulling means 8.2 can be coupled to a second articulation point 20.2 (FIG. 1) on the other gripper finger 2.2, such that the two articulation points 20.1, 20.2 are at the same height, and the pulling means 8.1, 8.2 are connected to the puller wire actuating means 16 at a different height which is closer to the main gripper body 3 than the first articulation point 20.1 and the second articulation point 20.2.

The connection point at which the pulling means 8.1, 8.2 are connected to the puller wire actuating means 16 at the same height can be formed by a closed shaft through-hole (not shown) or by the open-sided shaft through-hole 29.

By coupling the one pulling means 8.1 to a first articulation point 20.1 on one gripper finger 2.1 and the other pulling means 8.2 to a second articulation point 20.2 on the other gripper finger 2.2 in such a way that the two articulation points 20.1, 20.2 are at the same height, and the pulling means 8.1, 8.2 are connected to the puller wire actuating means 16 at a lower height which is closer to the main gripper body 3 than the first articulation point 20.1 and the second articulation point 20.2, it is initially ensured when the gripper 1 begins to close that the pulling means 8.1, 8.2 are aligned obliquely downwards in the direction of the center of the gripper 1, i.e. in the direction of the puller wire actuating means 16, so that a traction force caused by the drive motor 4, which runs through the pulling means 8.1, 8.2, has at the respective articulation point 20 of the gripper finger 2.1, 2.2 a force component pointing in the direction of the main gripper body 3. At the same time, this ensures that the pulling means 8.1, 8.2, starting from the closed shaft through-hole 19 or starting from the open-edged shaft through-hole 29 of the puller wire actuating means 16, are wound up onto the shaft 17.1 or the shaft 17.2 in a direction away from the main gripper body 3, i.e. in the direction of the free end of the shaft 17.1 or the shaft 17.2.

The drive motor 4 can be arranged in a receiving pocket 32 formed on the main gripper body 3, such that when the drive motor 4 is accommodated in the receiving pocket 32, the motor shaft of the drive motor 4 extends centrally along an axis of symmetry of the gripper 1 out of the main gripper body 3 in the direction of the gripping gap of the gripper 1.

Various exemplary embodiments of the switchable switching means 24 according to the invention are shown in FIG. 3 to FIG. 12 and explained in more detail below.

The switching means 24 is generally switchable between a first switch position (FIG. 3, FIG. 4, FIG. 6, FIG. 8, FIG. 9 and FIG. 11) and a second switch position (FIG. 5, FIG. 7, FIG. 10 and FIG. 12).

In the first switch position, the pulling means 8.1, 8.2 is fully released from the switching means 24, so that by the pulling means 8.1, 8.2 being pulled, the gripper finger 2.1, 2.2 movably mounted on the main gripper body 3 is not only pulled into its closed position but the kinematic chain of the finger elements 7 of the movably mounted gripper finger 2.1, 2.2 is also bent.

In the second switch position, the switching means 24 locks a pulling means section of the pulling means 8.1, 8.2 running along the kinematic chain of the finger elements 7 of the movably mounted gripper finger 2.1, 2.2, so that by the pulling means 8.1, 8.2 being pulled (arrow P), the gripper finger 2.1, 2.2 movably mounted on the main gripper body 3 is only pulled into its closed position, without the kinematic chain of the finger elements 7 of the movably mounted gripper finger 2.1, 2.2 being bent.

The switching means 24 can be a driveless switching means 24 which comprises a mechanical sensing element 5 mounted on the fingertip element 7*c*, a pulling-means clamping device 6 and a coupling means 9 which transmits the movement of the mechanical sensing element 5 to the pulling-means clamping device 6, so that when the sensing element 5 is actuated, the pulling-means clamping device 6 is moved into its clamping position in order to assume the second switch position of the switching means 24.

In the case of the embodiments shown in FIG. 3 to FIG. 7, the pulling-means clamping device 6 is formed on the finger root element 7*a* and is accordingly designed in its clamping position (FIG. 5, FIG. 7) to lock at the finger root element 7*a* the pulling means 8.1, 8.2 leading through the finger root element 7*a* in the second switch position of the switching means 24, i.e. in the present case the sensing element 5.

Figure 6:
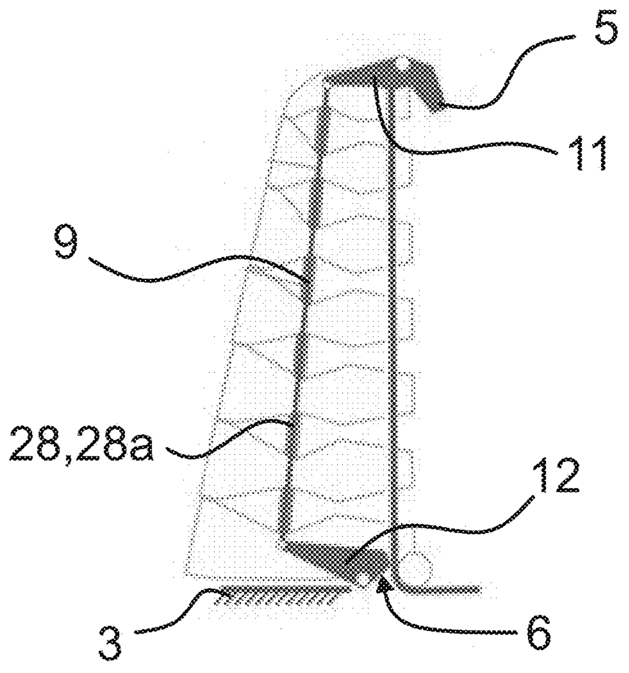
FIG. 6 is a schematic representation of a specific variant of a switching means in the extended position of the bendable gripper finger with levers and a coupling means in the neutral bending axis of the gripper finger when the pulling means is released.
Figure 7:
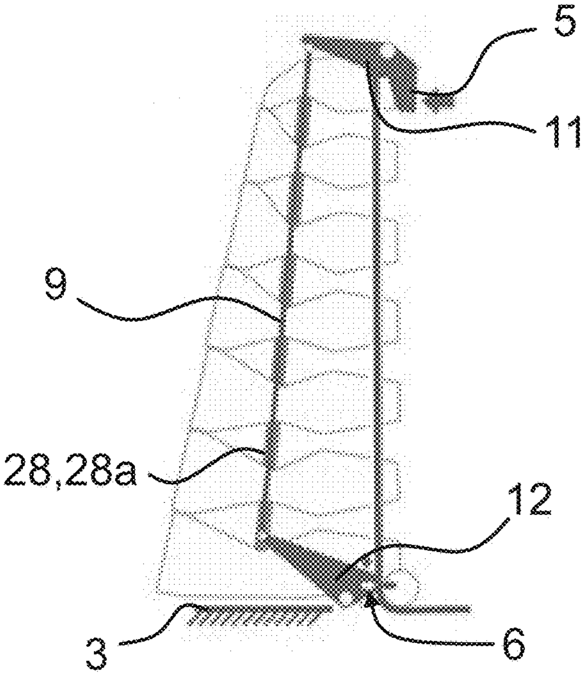
FIG. 7 is a schematic representation of the specific variant of the switching means according to FIG. 6 when the pulling means is locked.
Figure 8:
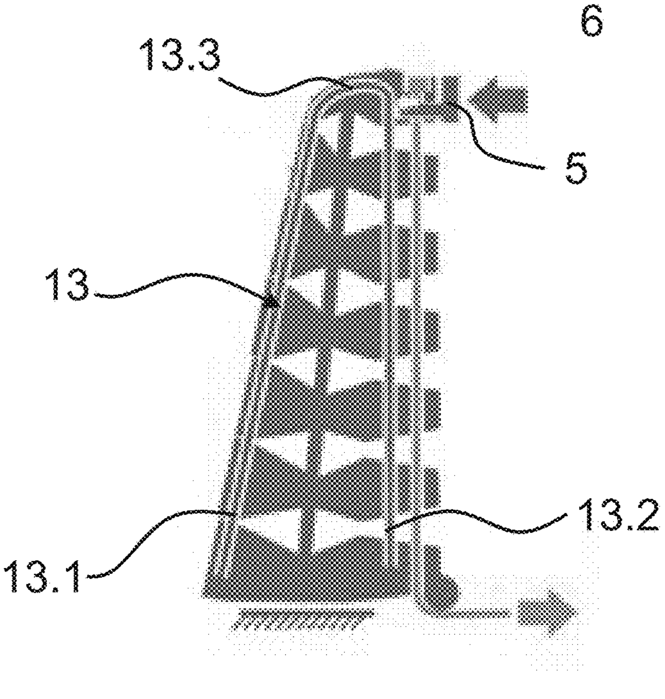
FIG. 8 is a schematic representation of a second exemplary embodiment of a switching means in the extended position of the bendable gripper finger when the pulling means is released.
Figure 9:
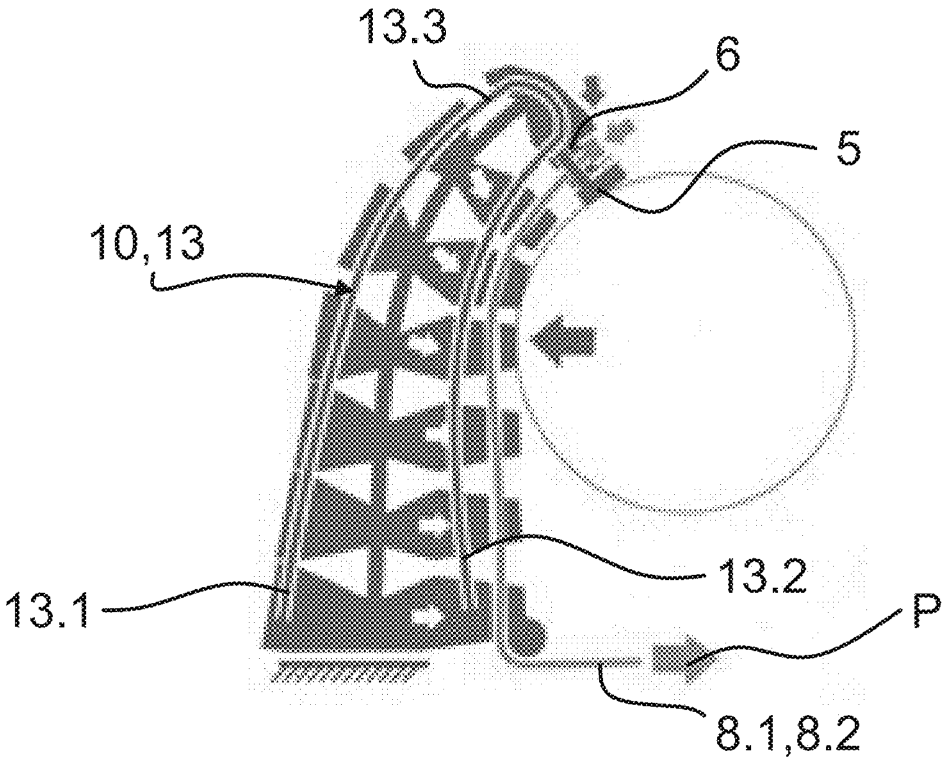
FIG. 9 is a schematic representation of the second exemplary embodiment of the switching means according to FIG. 8 in a bent position of the bendable gripper finger when the pulling means is released.
Figure 10:
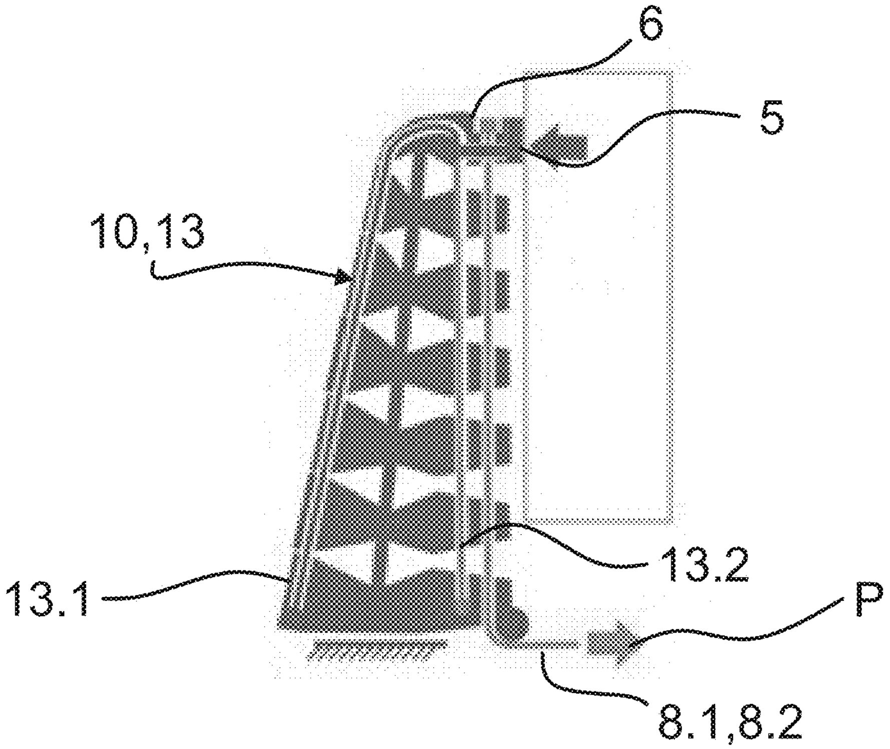
FIG. 10 is a schematic representation of the second exemplary embodiment of the switching means according to FIG. 8 in the extended position of the gripper finger when the pulling means is locked, so that the gripper finger can no longer be bent.
Figure 11:
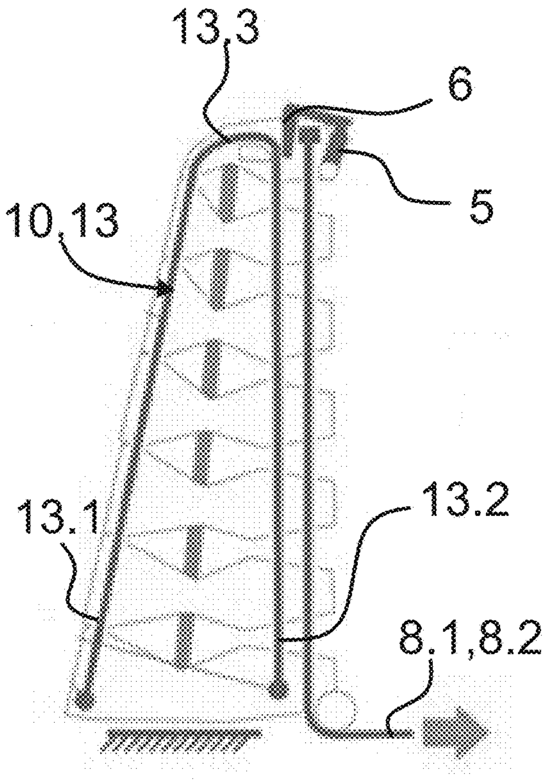
FIG. 11 is a schematic representation of a specific variant of a switching means in the extended position of the bendable gripper finger according to FIG. 8 when a rocker arm is in a release position.
Figure 12:
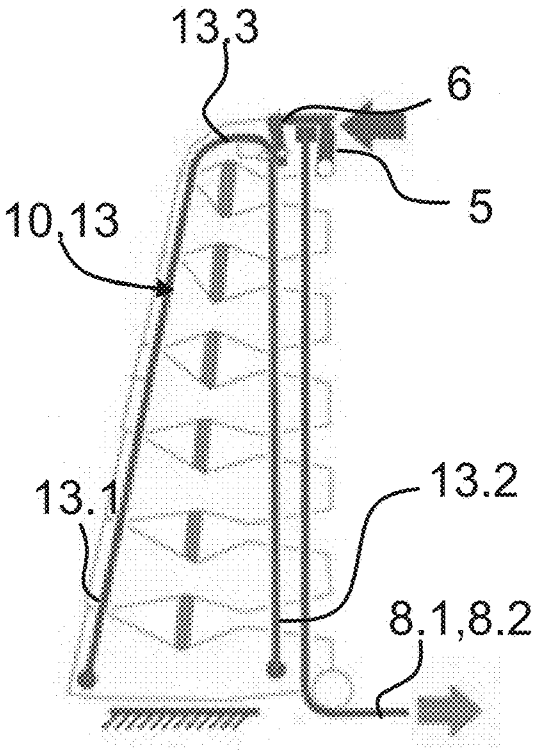
FIG. 12 is a schematic representation of the specific variant of the switching means according to FIG. 11 when the rocker arm is in a locking position, in which the additional pulling means, i.e. the anchoring means, is locked.

In the case of the embodiment according to FIG. 6 and FIG. 7, the mechanical sensing element 5 is pivotably mounted on the fingertip element 7*c* and has a first lever 11 to which a distal end of the coupling means 9 is connected and a proximal end of the coupling means 9 is connected to a second lever 12 which is pivotably mounted on the finger root element 7*a* and carries the pulling-means clamping device 6.

In the case of the embodiments according to FIG. 8 to FIG. 13, the coupling means 9 is designed as a second pulling means 10 or as an anchoring means 13, which is routed along the kinematic chain of the finger elements 7 of the movably mounted gripper finger 2.1, 2.2 in the region of a neutral bending axis 28*a* of the gripper finger 2.1, 2.2 from the fingertip element 7*c* to the finger root element 7*a*.

In these embodiments, the pulling-means clamping device 6 is formed on the fingertip element 7*c* and is designed in its clamping position (FIG. 10, FIG. 12) to lock at the fingertip element 7*c* the anchoring means 13 running through the fingertip element 7*c* in the second switch position of the switching means 24.

The anchoring means 13 can have a first end section 13.1 anchored to the finger root element 7*a* on the convex side of the neutral bending axis 28*a* of the kinematic chain of the finger elements 7 of the movably mounted gripper finger 2.1, 2.2, a second end section 13.2 anchored to the finger root element 7*a* on the concave side of the neutral bending axis 28*a* of the kinematic chain of the finger elements 7 of the movably mounted gripper finger 2.1, 2.2, and a middle section 13.3 which runs from the first end section 13.1 on the finger root element 7*a* on the concave side of the gripper finger 2.1, 2.2 to the fingertip element 7*c* and from the fingertip element 7*c* on the concave side of the gripper finger 2.1, 2.2 back to the finger root element 7*a*, and which ends at the second end section 13.2 at the finger root element 7*a*.

The middle section 13.3 of the anchoring means 13 routed through the fingertip element 7*c* can in the first switch position of the switching means 24 (FIG. 9, FIG. 11) be released for the anchoring means 13 to pass through the fingertip element 7*c* and in the second switch position of the switching means 24 (FIG. 10, FIG. 12) the anchoring means 13 can be fastened in place in the fingertip element 7*c* by the pulling-means clamping device 6.

Figure 13:
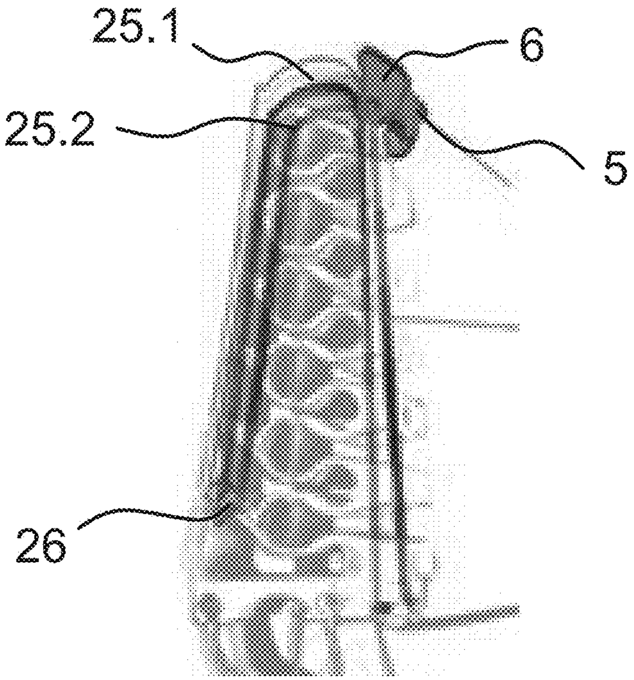
FIG. 13 is a schematic representation of a modification of the gripper finger according to FIG. 11 and FIG. 12, in which the additional pulling means, i.e. the anchoring means, is routed from an inner side of the gripper finger via a deflection in the fingertip element to the outer side of the gripper finger and is routed back to the inner side of the gripper finger from the outer side of the gripper finger by means of a deflection.

In the modification according to FIG. 13, the anchoring means 13 is routed from the finger root element 7*a* from an inner side of the gripper finger 2.1, 2.2 via a first deflection 25.1 in the fingertip element 7*c* to the outer side of the gripper finger 2.1, 2.2 and is routed back from the outer side of the gripper finger 2.1, 2.2 to the inner side of the gripper finger 2.1, 2.2 up to the finger root element 7*a* by means of a second deflection 25.2 formed on the finger root element 7*a*.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot gripper, comprising:

a main gripper body;

at least two gripper fingers, of which at least one is a movable gripper finger movably mounted on the main gripper body;

at least one drive motor designed to move the at least one movable gripper finger;

the at least one movable gripper finger comprising a kinematic chain of a plurality of successive finger elements which are adjustably mounted relative to one another;

wherein a proximal finger element in the kinematic chain forms a finger root element;

a distal finger element in the kinematic chain forms a fingertip element;

at least one pulling means extending longitudinally along the kinematic chain of the respective finger elements is connected to the fingertip element and is designed to move the movable gripper finger from an open position into a closed position, and/or to bend the kinematic chain of finger elements in response to a pulling action on the pulling means; and a switching means which can be switched to and between a first switch position and a second switch position;

wherein the switching means fully releases the pulling means in the first switch position, such that the movable gripper finger is pulled into its closed position and the kinematic chain of finger elements is also bent, in response to the pulling means being pulled; and wherein the switching means in the second switch position locks a section of the pulling means running along the kinematic chain of finger elements, such that the movable gripper finger is only pulled into its closed position, without the kinematic chain of finger elements being bent, in response to the pulling means being pulled.

2. The robot gripper of claim 1, wherein the switching means is a driveless switching means, comprising:

a mechanical sensing element mounted on the fingertip element;

a pulling-means clamping device having a clamping position clamped against the pulling means, and an unclamped position disengaged from pulling means; and a coupling means adapted to transmit an actuation of the mechanical sensing element to the pulling-means clamping device, such that when the sensing element is actuated, the pulling-means clamping device is moved into its clamping position in order to assume the second switch position of the switching means.

3. The robot gripper of claim 2, wherein the pulling-means clamping device is formed on the finger root element and is designed, in its clamping position corresponding to the second switch position of the switching means, to lock the pulling means at the finger root element.

4. The robot gripper of claim 3, wherein:

the mechanical sensing element is pivotably mounted on the fingertip element and has a first lever coupled with a distal end of the coupling means;

a proximal end of the coupling means is connected to a second lever which is pivotably mounted on the finger root element; and the second lever carries the pulling-means clamping device.

5. The robot gripper of claim 4, wherein the coupling means is designed as a second pulling means which is routed along the kinematic chain of finger elements of the movable gripper finger, and in a region of a neutral bending axis of the movable gripper finger that extends from the fingertip element to the finger root element.

6. The robot gripper of claim 2, wherein the pulling-means clamping device is formed on the fingertip element and is designed, in its clamping position corresponding to the second switch position of the switching means, to lock at the fingertip element an anchoring means that is routed through the fingertip element.

7. The robot gripper of claim 6, wherein the anchoring means comprises:

a first end section anchored to the finger root element on a convex side of a neutral bending axis of the kinematic chain of finger elements of the movable gripper finger;

a second end section anchored to the finger root element on a concave side of the neutral bending axis of the kinematic chain of finger elements of the movable gripper finger; and a middle section routed from the first end section on the finger root element, on the convex side of the neutral axis to the fingertip element, and from the fingertip element on the concave side of the gripper finger neutral axis back to the finger root element, and ending at the second end section on the finger root element.

8. The robot gripper of claim 7, wherein:

the middle section of the anchoring means that is routed through the fingertip element is released in the first switch position of the switching means such that the anchoring means passes through the fingertip element; and in the second switch position of the switching means, the anchoring means is secured in place in the fingertip element by the pulling-means clamping device.

9. The robot gripper of claim 8, wherein:

the anchoring means, starting from the finger root element, is routed from an inner side of the gripper finger via a deflector in the fingertip element, to the outer side of the gripper finger; and the anchoring means is routed by a second deflector formed on the finger root element, from the outer side of the gripper finger back to the inner side of the gripper finger and up to the finger root element.

10. The robot gripper of claim 1, wherein at least one of:

the at least one movable gripper finger is mounted on the main gripper body in a linearly displaceable manner, and a linear adjustment of the movable gripper finger relative to the main gripper body takes place when the pulling means is pulled; or the at least one movable gripper finger is pivotably mounted on the main gripper body, and a pivoting adjustment of the movable gripper finger relative to the main gripper body takes place when the pulling means is pulled.

* * * * *